INVENTOR
ROBERT L. HESS
BY Lyon & Lyon
ATTORNEYS

United States Patent Office 3,669,824
Patented June 13, 1972

3,669,824
RECOVERABLE ARTICLE
Robert L. Hess, Menlo Park, Calif., assignor to
Raychem Corporation, Menlo Park, Calif.
Filed Aug. 25, 1969, Ser. No. 852,830
Int. Cl. B32b 7/02, 7/10
U.S. Cl. 161—166       11 Claims

ABSTRACT OF THE DISCLOSURE

The present invention relates to a heat-recoverable article particularly adapted for use as a covering on wires, cables and the like. More particularly, the invention relates to a helical heat-recoverable tape, having an outer wall of heat-recoverable material and an inner wall which comprises a material which is fusible at the temperature at which the tape recovers so that when the tape is placed around an article and heated to cause recovery, the fusible inner surface will flow to cause a good seal between the tape and article.

BACKGROUND OF THE INVENTION

It is often necessary to repair insulation breaks on electrical conductors such as telephone lines, etc. An effective method for repairing such breaks involves the use of heat-recoverable tubing. Heat-recoverable tubing, e.g., plastic tubing, may be formed by heating and distorting a crosslinked thermoplastic tubing followed by cooling. Upon subsequent heating to the temperature at which distortion took place, the heat-recoverable tubing will recover to its original diameter. Processes for obtaining such heat-recoverable materials and examples of materials useful in forming such heat-recoverable tubing may be found in Currie Pat. No. 2,027,962 and Cook Pat. No. 3,086,242, the disclosures of which are incorporated herein by reference.

The heat-recoverable tubing may be slipped over the article to be prepared and then heated to cause the tubing to shrink down around the article. Although this process is of great value in covering wires, cables and the like, it cannot be used with long articles since it is impractical to slide the tubing section over such articles to the place where the break exists.

U.S. Pat. No. 3,033,727 describes the use of a heat-shrinkable tape which may be used on insulated conductors. Such tapes have several disadvantages. Because such tapes are formed by a stretching of the tape in its long dimension, heat-recovery of the tape will result in shrinkage in the long dimension and a resulting increase in width. This increase in width results in undesirable buckling and also will result in the tube formed by the tape wrap being shorter after heat-recovery than it was when applied. As a result, portions of the area which were intended to be covered may be exposed after recovery. An additional disadvantage of a tape is that it does not form a good seal even though the edges of the tape are overlapped. U.S. Pat. 3,033,727 discloses the use of a second tape of thermoplastic material which will perform a sealing function upon heating. However, the formation of a double wrap using two tapes requires great dexterity and is often impractical for field use.

SUMMARY OF THE INVENTION

It is accordingly an object of the present invention to provide a heat recoverable tape that will recover to form a tight wrapping around the article being taped and at the same time form a resin bond between the tape and the article being taped.

Further, it is an object of this invention to provide a heat-recoverable tape wherein the locked in elongation is primarily in the radial direction with respect to a tubular article about which the tape is being wrapped.

A further object is to provide a heat-recoverable helical tape which, upon recovery, will form a unitary helical tube.

A further object of this invention is to provide a novel heat-recoverable helical tape which, upon shrinkage, recovers to provide a snug-fitting integral tubular covering without buckling.

Another object of this invention is to provide a heat-shrinkable helical tape which will recover to form a unitary tube to quickly and easily encapsulate and insulate an object.

These and other objects of the invention will become apparent from the detailed description which follows.

Briefly, the present invention comprises a helical recoverable tape having an outer wall of heat-recoverable material and an inner wall which is fusible at the temperature of recovery. The tape is formed by helically cutting a heat-recoverable tube having a heat-recoverable outer wall and a fusible inner wall.

DESCRIPTION OF PREFERRED EMBODIMENTS

Figure 1:
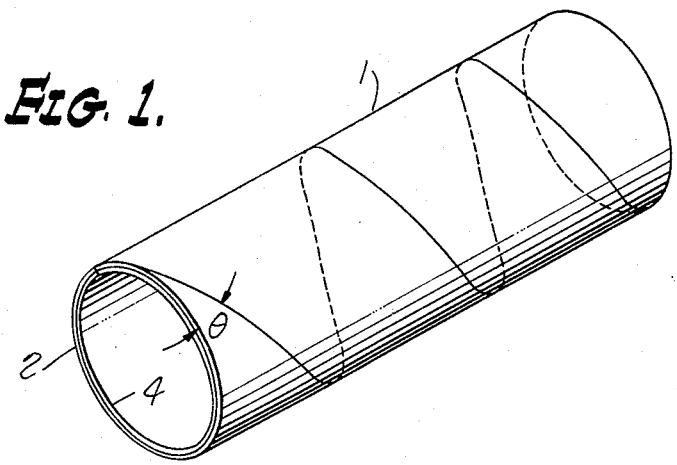
FIG. 1 illustrates the manner of slitting a tube to form a tape according to this invention.

The first step in forming the heat-recoverable tape of this invention is the formation of a heat-recoverable tubing having an outer relatively infusible wall and an inner, relatively fusible wall. Methods for making such tubing include that set forth in U.S. Pat. No. 3,455,337, the disclosure of which is incorporated herein by reference.

In general, a dual walled tube is formed by selectively crosslinking the outer wall of a uniform tube of polymeric material or by crosslinking a tube having an outer wall which comprises a material having much greater susceptibility to crosslinking than the inner wall.

A preferred method of making such a tube is to extrude an outer jacket of thermoplastic material which is highly susceptible to crosslinking over an inner tubing of thermoplastic material. The inner and outer tubing tend to fuse at their interface thus forming an essentially integral dual walled thermoplastic tubing. The dual walled thermoplastic tubing is then subject to irradiation or other type of crosslinking such as chemical crosslinking to crosslink the outer wall and render it substantially infusible but which will not crosslink the inner wall. The crosslinked tubing is then converted to a heat-recoverable state, e.g., by heating, expanding and cooling. Upon the application of heat, the inner fusible wall will fuse and the outer infusible wall will tend to recover the tubing to its unexpanded diameter.

The relatively fusible and infusible portions of the article are joined together in such a manner that the resulting article is essentially homogeneous. Thus, in a preferred embodiment, these portions are united by compound extrusion before the portion which is to be relatively infusible has acquired this property. The homogeneous article is then treated, e.g., by radiation or chemical means, to crosslink a portion of the article to render this portion relatively infusible. Thus, according to this embodiment, the property of elastic memory is imparted to at least the relatively infusible portion. It is preferred to extrude the homogeneous article as a tube, irradiate the tube, expand the tube, and quench the tube while expanded. However, the present invention may also be practiced with a flat sheet by uniaxial or biaxial stretching of the sheet and quenching the sheet in the stretched condition. The flat sheet may, of course, be extruded as such or may be produced by slitting an extruded tube. Furthermore, the article may be produced by molding rather than by extruding. In another embodiment, the relatively infusible material may comprise a very high molecular weight material which has gel strength and wthich has the property of elastic memory, e.g., polytetrafluoroethylene. It is also within the scope of the present invention to provide the homogeneous article with a reinforcing material such as a braid or knit fabric. The relatively fusible portion of the article of the present invention may comprise one exterior surface of the article or may comprise as much as the entire exterior surface of the article. In the case of tubular articles, the relatively fusible portion may comprise the iner or outer exterior surface or both.

In the preferred embodiment of the present invention, the relatively infusible portion is rendered such by crosslinking, preferably by irradiation. Since the irradiation is performed after the formation of the essentially homogeneous article, it is necessary that relatively infusible portion be capable of being crosslinked by a radiation dose which is insufficient to crosslink the relatively fusible portion to the point where it would be rendered infusible. This may be achieved by various methods. One such method is to control the initial molecular weight and/or molecular weight distribution such that the subsequent irradiation does not crosslink the relatively infusible portion to the point where it is infusible.

For example, it is known that both molecular weight and molecular weight distribution have a vast influence on the dose-to-infusibility of polyethylene, as disclosed by Lawton et al., Ind. Eng. Chem., 46, 1703 (1954). Thus, the desired crosslinking properties of both portions may be achieved by manipulation of these molecular weight characteristics when polyethylene is used. Practical limits, expressed in terms of melt index, on the molecular weight of polyethylene are as follows: relatively infusible portion about 0.3 or lower; relatively fusible portion about 20 or higher.

Antirads may also be used to control infusibility. These materials, when incorporated into polymers function by chemical means to prevent crosslinking of the polymers e.g., by free radical reactions. Some thermal antioxidants for olefin polymers function as strong antirads. Thus, the incorporation of a thermal anti-oxidant in the relatively fusible portion serves the dual function of preventing this portion from reaching the infusibility point during irradiation and also serves to protect the polymer against thermal degradation. Of course, other materials which are not antioxidants function as antirads. An example of a thermal antioxidant antirad for polyolefins is 4,4'-thiobis(6-tert-butyl-m-cresol). Other examples are: 4,4' methylene-bis-(2 - tert-butylphenol); 2 - 6, ditert-butylphenol; 4,4'-butylidenebis - (6 - tert-butyl-m-cresol); 2,5 - di (t-amyl) hydroquinone. Examples of antirads which are not antioxidants are: pentabromophenol, naphthylene, copper stearate.

Among the various polymeric materials which may be used to accomplish the objects of the present invention are polyethylene, polypropylene, nylon, fluorinated ethylene propylene, polyvinylchloride, polyvinylidene fluoride, and acrylic polymers. In general, all polymeric materials capable of being crosslinked by irradiation or chemical means and capable of forming an elastic memory material may be employed to form relatively infusible portion. In addition, very high molecular weight materials which have strength above the crystalline melting temperature and which are capable of possessing elastic memory may also be used.

Furthermore, combinations of materials may be used to form the article of the present invention. It is essential that the combined materials be capable of forming such an intimate bond with each other than an essentially homogeneous article may be produced. For example, polyethylene and polypropylene may be used together.

The relatively infusible portion of the article of the present invention is, in general, produced in a manner similar to the relatively fusible portion except that the relatively infusible portion comprises a material which reaches the infusibility point at radiation doses insufficient to cause the relatively fusible portion to lose this property. Thus, a material having a higher molecular weight than the relatively fusible portion may be used, or crosslinking agents such as polymerizable comonomers may be added to the relatively infusible portion. Examples of such crosslinking agents are: divinyl benzene, polybutadiene, allyl methacrylate, divinyl succinate, ethylene glycol diacrylate, diallyl fumarate, triallyl phosphate, triallyl cyanurate. These crossinking agents promote crosslinking at low radiation doses in the relatively infusible portion, particularly when polyolefins and polyvinyl halides are used.

Thus, it will be apparent to those skilled in the art that by the use of an antirad and/or control of molecular weight in the relatively fusible portion, and/or by use of a crosslinking agent and/or control of molecular weight in the relatively infusible portion, it is possible to produce an article which, although it is essentially homogeneous, possesses different melting characteristics. The relatively fusible portion will then function to form a secure, impervious and intimate bond with an article to which the article of the present invention is attached upon the application of sufficient heat and the relatively infusible portion of the present invention will function as a strong and intimately bonded covering or support. It is, of course, also possible to incorporate into the relatively fusible portion, the relatively infusible portion, or both, fillers, flame retardants, etc., as may be desired for a particular purpose. Futhermore, it is possible to obtain additional high temperature strength and/or chemical bonding by coating or incorporating into the relatively fusible portion of the article of the present invention with a material capable of chemically crosslinking or vulcanizing the relatively fusible portion which will function to crosslink this portion when the article is heated to cause it to bond to another article.

It is relatively easy to control the expansion of a tubing so that there is little increase in tubing length as the tubing diameter increases. In other words, most of the effect of the expansion is manifested by a decrease in the wall thickness of the tubing. This characteristic of the tubing is very important in that it makes it posssible to make the helical tape of the present invention with very little length decrease upon heat-recovery.

After the dual walled tube has been placed in its heat-recoverable condition, it is ready to be helically cut to form the tape. Although any desired angle may be used for the helix it has been found that the best results are obtained when the following criteria are observed. The tape, when wrapped about the part over which it is to recover, should have an overlap of about 50%. This overlap will insure that there will be no gaps in the tape if it shrinks in the width dimension upon recovery. Furthermore, the best fit is obtained when the tape is recovered over an article which has a diameter equal to the diameter of the expanded tube from which the tape was cut. The recoverable tubing diameter should generally be at least one half the maximum diameter of the cylindrical member about which it is recovered but less than the minimum diameter of the cylindrical member.

The manner in which the helical cut is formed is shown in FIG. 1. A tube 1 having a heat-recoverable outer wall 2 and a fusible inner wall is cut so that an angle is formed with the edge of the tube. The angle $\theta$, at which the slit is made in the tubing, hereinafter called the "angle of the helix," is determined by the circumference of the heat-recoverable tubing and the desired axial coverage per wrap of tape, commonly referred to as the "lead." From these two values, in accordance with elementary principles of geometry, the angle of the helix is calculated as follows:

$$\theta = \tan^{-1} \frac{\text{lead}}{\text{circumference}}$$

Having determined the angle of the helix, the tube is then cut to this angle. The helix may be marked on the surface of the heat-recoverable tube and the wall of the tube cut with a sharp instrument along the marking. A continuous method of cutting long tubes which are rotated and moved along a mandrel may be used. The resulting helically cut tube, when laid flat, resembles a strip, the width of which corresponds to the lead of the helix, and which when released resumes the original tubular configuration.

Figure 2:
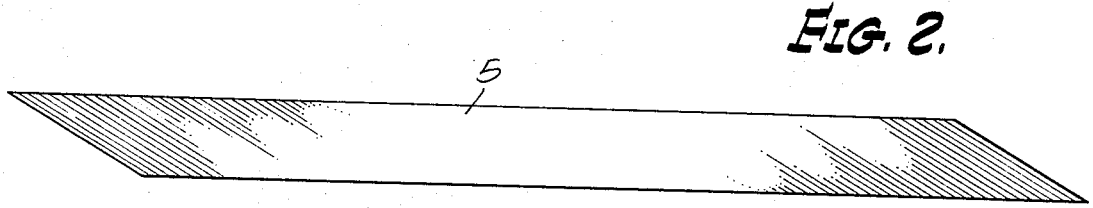
FIG. 2 illustrates the tape resulting from slitting the tube of FIG. 1.
Figure 3:
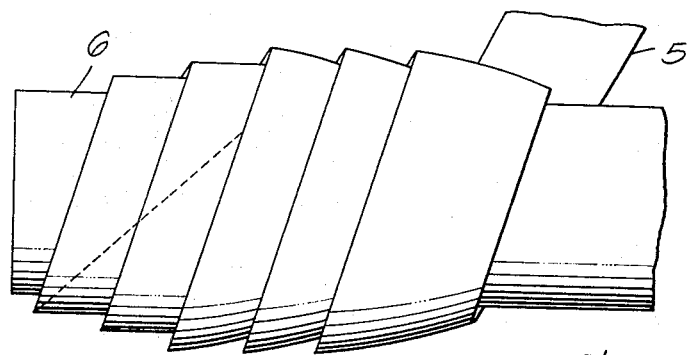
FIG. 3 illustrates the method of wrapping the tape on a substrate.
Figure 4:
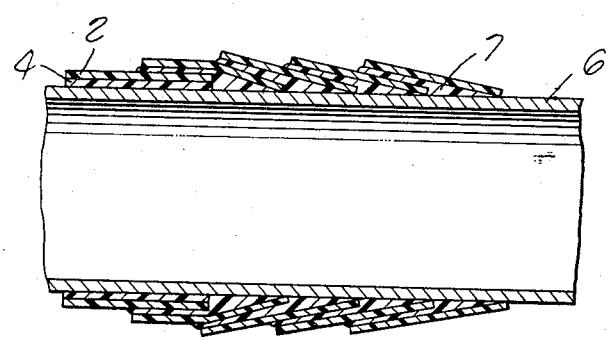
FIG. 4 is a cross-sectional view illustrating the structure formed using the tape.

The resulting tape 5 is shown in FIG. 2, and may be used directly or rolled up for later use. Use of the heat-recoverable tape is illustrated in FIG. 3 where tape 5 is wrapped on a substrate 6. Normally, the substrate will be a long cylindrical member. Each wrap will overlap the adjacent one by approximately one half the width of the tape. When the wrapping has been completed, the last wrap may be secured by a clamp, conventional tape, etc. The heat-recoverable tape is then heated, preferably at the first wrap, to a temperature which will cause recovery of the recoverable material. Any desired heating means such as an open flame, catalytic heater, radiant heat, pyrotechnical sheath, etc., may be used. For polyolefin-type materials, the heat recovery temperature is generally on the order of about 240°–250° F. As the tape recovers, the primary shrinkage is in the radial direction. Thus, the coverage of the tape on the member will not change substantially. When the tape is heated to its heat-recovery temperature, the inner layer will fuse. As the inner layer fuses, it flows along the surface of the substrate which is covered by the tape tending to form a continuous tubular covering over the surface of the substrate. Since the fusible material is also bonded to the infusible heat-recoverable other layer of the tape, the outer layer also forms the outer layer for the tube. Thus, in essence, the tape is converted to a unitary, integral tube covering the substrate. FIG. 4 is a cross-sectional view illustrating the structure formed by the tape after it has recovered. The fusible layer 4 has flowed to fill in the voids which exist at the double cross hatched areas 7.

Thus, the present invention makes it possible to obtain a tubular covering over a long member which could not normally be covered by a heat-recoverable tube.

The present invention is further illustrated by the following example.

EXAMPLE

This example illustrates the covering of a ¾ inch diameter rod with the heat-recoverable tape of this invention. Having determined the diameter of the substrate, the dual walled tube was formed by first extruding a tube of ethylene acrylic acid copolymer containing a plasticizer to form a tube having an inside diameter of ⅜ of an inch. Then the tubing was passed through a second extrusion step in which an outer jacket of polyamide and a cholorosulfonated polyethylene was extruded tightly in adherence to the inner tube. The outer tube was then irradiated by means of an electron beam generator to a dosage of 10 megarads. The tubing was then expanded to an inside diameter of ¾ inch. The tube circumference is $\pi 0.820$ (tube OD) or 2.57". The angle of the helix is then an angle whose tangent is $$\frac{0.75}{2.57}$$

or 17°14'. The wall of the tube was then marked with a helix having the above angle and the tube was cut with a sharp knife along the marking. The resulting helically cut tube, when laid flat, was a strip, the width of which corresponded to the lead of the helix. The conduit substrate was then wrapped with the helix in such a manner that each wrap overlaid its adjacent one approximately ⅜ of an inch. When the wrap was completed, it was clamped with a constant pressure clamp and the wrapped tape was heated to a temperature of 275° F. The tape shrunk and exerted a force on the inner fusible layer of material causing the material to flow and fill in voids. Upon cooling, the part became a homogeneous tubular covering having excellent strength and electrical properties.

What is claimed is:

1. A heat-recoverable tape consisting essentially of a heat-recoverable tube having concentric inner and outer walls of polymeric material, said outer wall being crosslinked and heat-recoverable and said inner wall being substantially non-crosslinked and fusible at the temperature of heat-recovery of the outer wall, said tubing having a helical cut through the wall thereof.

2. The tape of claim 1 wherein said outer and inner walls are intimately bonded with each other.

3. The tape of claim 1 wherein the outer wall is an infusible crosslinked thermoplastic polymeric material and the inner wall is a relatively fusible polymer.

4. The tape of claim 1 wherein the outer wall is crosslinked by high energy irradiation.

5. The tape of claim 1 wherein the outer wall is crosslinked by chemical means.

6. The tape of claim 1 wherein the chemical composition of the polymer comprising the outer wall is different from that polymer comprising the inner wall.

7. The tape of claim 1 wherein the chemical composition of the polymer comprising the outer wall is substantially the same as that of the polymer forming the inner wall.

8. The article of claim 1 wherein the outer wall comprises polyethylene having a melt index of less than about 0.3 which has been subjected to irradiation and said inner wall comprises polyethylene having a melt index of about 20 or higher which has been subjected to irradiation.

9. The tape of claim 1 wherein the fusible inner wall contains an antirad.

10. The tape of claim 1 wherein the outer wall contains a crosslinking agent.

11. The tape of claim 1 wherein the tube has a unitary, one-piece wall containing sufficient crosslinked density near a first surface thereof to be substantially infusible and containing a gradual decreasing density of crosslinking throughout the thickness of said wall, and said wall being fusible and substantially non-crosslinked near the surface opposite said first surface.

References Cited

UNITED STATES PATENTS

| | | | |
|---|---|---|---|
| 3,455,337 | 7/1969 | Cook | 138—178 |
| 3,309,260 | 3/1967 | Boese | 161—402 |
| 3,033,727 | 5/1962 | Cram et al. | 174—110 PM |
| 3,050,787 | 8/1962 | Richardson et al. | 174—20 |
| 2,027,962 | 1/1936 | Currie | 264—230 |
| 3,086,242 | 4/1963 | Cook et al. | 264—210 |
| 3,093,448 | 6/1963 | Kirkpatrick et al. | 264—272 |
| 3,097,150 | 7/1963 | Rainer et al. | 161—412 |
| 3,294,621 | 12/1966 | Baird, Jr. et al. | 161—252 |
| 3,466,210 | 9/1969 | Wareham | 156—86 |

JOHN T. GOOLKASIAN, Primary Examiner

G. W. MOXON II, Assistant Examiner

U.S. Cl. X.R.

156—53, 244, 255; 161—139, 167, 252, 402, 411; 174—110 PM; 264—150, 230